(12) United States Patent
Kim et al.

(10) Patent No.: US 11,791,098 B2
(45) Date of Patent: Oct. 17, 2023

(54) DIELECTRIC AND MULTILAYER CAPACITOR INCLUDING THE SAME

(71) Applicant: SAMSUNG ELECTRO-MECHANICS CO., LTD., Suwon-si (KR)

(72) Inventors: Jin Woo Kim, Suwon-si (KR); Jong Suk Jeong, Suwon-si (KR); Jong Hoon Yoo, Suwon-si (KR); Chun Hee Seo, Suwon-si (KR); Jeong Wook Seo, Suwon-si (KR); Dong Geon Yoo, Suwon-si (KR); Dong Hun Kim, Suwon-si (KR); Su Been Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 79 days.

(21) Appl. No.: 17/529,721

(22) Filed: Nov. 18, 2021

(65) Prior Publication Data

US 2022/0189694 A1  Jun. 16, 2022

(30) Foreign Application Priority Data

Dec. 16, 2020 (KR) .................. 10-2020-0176581
Jun. 8, 2021 (KR) .................. 10-2021-0074123

(51) Int. Cl.
*H01G 4/12* (2006.01)
*C04B 35/468* (2006.01)
(Continued)

(52) U.S. Cl.
CPC ....... *H01G 4/1227* (2013.01); *C04B 35/4682* (2013.01); *H01G 4/248* (2013.01);
(Continued)

(58) Field of Classification Search
None
See application file for complete search history.

(56) References Cited

U.S. PATENT DOCUMENTS 7,541,305 B2 * 6/2009 Ito .................. C04B 35/638
501/138
8,445,397 B2 * 5/2013 Yamaguchi .......... H01G 4/1227
501/138
(Continued)

FOREIGN PATENT DOCUMENTS

JP  2001-240466 A  9/2001
JP  5151990 B2  2/2013
(Continued)

OTHER PUBLICATIONS

Office Action dated Jul. 7, 2023 for corresponding Korean Patent Application No. 10-2021-0074123 (See English Translation).
(Continued)

*Primary Examiner* — Dion R. Ferguson
(74) *Attorney, Agent, or Firm* — MORGAN, LEWIS & BOCKIUS LLP

(57) ABSTRACT

A multilayer capacitor includes a body including a plurality of dielectric layers, and a plurality of internal electrodes stacked with one of the dielectric layers interposed therebetween, and external electrodes disposed on external surfaces of the body and connected to the internal electrodes, respectively. The plurality of dielectric layers include a dielectric expressed by empirical formula $BaM1_aTi_{1-x}Sn_xM2_bO_3$ ($0.008 \leq x \leq 0.05$, $0.006 \leq a \leq 0.03$, and $0.0006 \leq b < 0.006$) in which M1 includes a rare earth element, and M2 includes at least one of Mn or V.

20 Claims, 2 Drawing Sheets

(51) Int. Cl.
*H01G 4/30* (2006.01)
*H01G 4/248* (2006.01)

(52) U.S. Cl.
CPC ....... *H01G 4/30* (2013.01); *C04B 2235/3236* (2013.01); *C04B 2235/85* (2013.01)

(56) References Cited

U.S. PATENT DOCUMENTS

| | | | | |
|---|---|---|---|---|
| 9,061,944 | B2* | 6/2015 | Fukuda | C01G 37/14 |
| 2001/0021095 | A1 | 9/2001 | Mizuno et al. | |
| 2003/0044347 | A1* | 3/2003 | Shirakawa | C04B 35/63 |
| | | | | 423/598 |
| 2006/0045840 | A1* | 3/2006 | Chen | C04B 35/4682 |
| | | | | 423/598 |
| 2006/0172880 | A1* | 8/2006 | Shirakawa | H10N 30/8536 |
| | | | | 423/598 |
| 2009/0207551 | A1 | 8/2009 | Suzuki | |
| 2011/0205686 | A1* | 8/2011 | Yamaguchi | C04B 35/638 |
| | | | | 501/137 |
| 2012/0081836 | A1* | 4/2012 | Yamaguchi | H01G 4/1227 |
| | | | | 501/139 |
| 2015/0170838 | A1 | 6/2015 | Suzuki et al. | |
| 2018/0040423 | A1* | 2/2018 | Nagaoka | H01G 4/248 |
| 2018/0130601 | A1 | 5/2018 | Kim et al. | |
| 2018/0182557 | A1 | 6/2018 | Park et al. | |
| 2019/0279817 | A1* | 9/2019 | Park | H01G 4/1263 |
| 2022/0189694 | A1* | 6/2022 | Kim | H01G 4/232 |

FOREIGN PATENT DOCUMENTS

| | | |
|---|---|---|
| JP | 6003988 B2 | 10/2016 |
| KR | 10-2018-0076628 A | 7/2018 |
| KR | 10-1922876 B1 | 11/2018 |
| WO | WO2011036970 A1 * | 2/2013 |

OTHER PUBLICATIONS

Bao, et al., "Study on the dielectric properties of oxide-doped Ba(Ti,Sn)O3 ceramics prepared from ultrafine powder", 1993, Journal of Materials Science, vol. 28, p. 6617-6621.

* cited by examiner

I-I'

DIELECTRIC AND MULTILAYER CAPACITOR INCLUDING THE SAME

CROSS-REFERENCE TO RELATED APPLICATION(S)

This application claims the benefit of priority to Korean Patent Application No. 10-2020-0176581 filed on Dec. 16, 2020, and Korean Patent Application No. 10-2021-0074123 filed on Jun. 8, 2021 in the Korean Intellectual Property Office, the disclosures of which are incorporated herein by reference in its entirety.

TECHNICAL FIELD

The present disclosure relates to a multilayer capacitor.

BACKGROUND

A capacitor is an element that may store electricity therein, and basically, when a voltage is applied to the capacitor in a state in which two electrodes are disposed to face each other, electricity is accumulated in the respective electrodes. In a case in which a direct current (DC) voltage is applied to the capacitor, a current flows in the capacitor while the electricity is accumulated, but when the accumulation of the electricity is completed, the current does not flow in the capacitor. Meanwhile, in a case in which an alternating current (AC) voltage is applied to the capacitor, an AC current flows in the capacitor while polarities of the electrodes are alternated.

Such a capacitor may be classified as several kinds of capacitors such as an aluminum electrolytic capacitor in which electrodes are formed of aluminum and a thin oxide layer is disposed between the electrodes formed of aluminum, a tantalum capacitor in which tantalum is used as a material of electrodes, a ceramic capacitor in which a dielectric having a high dielectric constant such as a barium titanate is used between electrodes, a multilayer ceramic capacitor (MLCC) in which a ceramic having a high dielectric constant is used in a multilayer structure as a dielectric provided between electrodes, and a film capacitor in which a polystyrene film is used as a dielectric provided between electrodes, depending on the type of insulator provided between the electrodes.

Thereamong, the multilayer ceramic capacitor has been recently and mainly used in various fields such as a high frequency circuit, since it has excellent temperature characteristics and frequency characteristics and may be implemented to have a small size. Recently, attempts to implement the multilayer ceramic capacitor with a smaller size have continued, and for this purpose, thicknesses of a dielectric layer and an internal electrode have been decreased. In addition, research into a dielectric material for implementing a multilayer ceramic capacitor having a high capacitance and excellent reliability has been conducted.

SUMMARY

An aspect of the present disclosure may provide a multilayer capacitor having an improved performance resulting from the use of a dielectric material having a high dielectric constant and excellent reliability.

According to an aspect of the present disclosure, a multilayer capacitor may include a body including a plurality of dielectric layers, and a plurality of internal electrodes stacked with one of the dielectric layers interposed therebetween, and external electrodes disposed on external surfaces of the body and connected to the internal electrodes, respectively. The plurality of dielectric layers may include a dielectric expressed by empirical formula $BaM1_aTi_{1-x}Sn_xM2_bO_3$ ($0.008 \leq x \leq 0.05$, $0.006 \leq a \leq 0.03$, and $0.0006 \leq b < 0.006$) in which M1 includes a rare earth element, and M2 includes at least one of Mn or V.

The rare earth element may include Dy.

The dielectric may include Dy in a content of 0.006 to 0.012 mole with respect to 1 mole of Ba.

M2 may include both Mn and V, and the dielectric may include Mn in a content of 0.0003 to 0.0035 mole with respect to 1 mole of Ba, and include V in a content of 0.0003 to 0.0025 mole with respect to 1 mole of Ba.

The dielectric may further include an Al component in a content of 0.003 mole or more less than 0.012 mole with respect to 1 mole of Ba.

The dielectric may further include a Mg component in a content of 0.001 mole or more less than 0.012 mole with respect to 1 mole of Ba.

The dielectric may further include a Si component in a content of 0.03 or more with respect to 1 mole of Ba.

The empirical formula may satisfy a condition $0.12 \leq a/x \leq 3.75$.

The empirical formula may satisfy a condition $0.012 \leq b/x \leq 0.75$.

In the empirical formula, a ratio of Ba to Ti (Ba/Ti) may be 1.010 to 1.050.

At least one of grains included in the plurality of dielectric layers may have a core-shell structure including a core and a shell portion covering the core.

A content of Sn in the shell portion may be higher than that in the core.

An average thickness of one of the plurality of dielectric layers may be 500 nm or less.

An average thickness of one of the plurality of internal electrodes may be 400 nm or less.

According to an aspect of the present disclosure, a dielectric may be expressed by empirical formula $BaM1_aTi_{1-x}Sn_xM2_bO_3$ ($0.008 \leq x \leq 0.05$, $0.006 \leq a \leq 0.03$, and $0.0006 \leq b < 0.006$), in which M1 includes a rare earth element, and M2 includes at least one of Mn or V.

The rare earth element may include Dy, and Dy may be in a content of 0.006 to 0.012 mole with respect to 1 mole of Ba.

M2 may include both Mn and V, Mn may be in a content of 0.0003 mole or more less than 0.0035 mole with respect to 1 mole of Ba, and V may be in a content of 0.0003 mole or more less than 0.0025 mole with respect to 1 mole of Ba.

The dielectric may further include an Al component in a content of 0.003 mole or more less than 0.012 mole with respect to 1 mole of Ba.

The empirical formula may satisfy a condition $0.12 \leq a/x \leq 3.75$.

The empirical formula may satisfy a condition $0.012 \leq b/x \leq 0.75$.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments in the present disclosure will now be described in detail with reference to the accompanying drawings.

Figure 1:
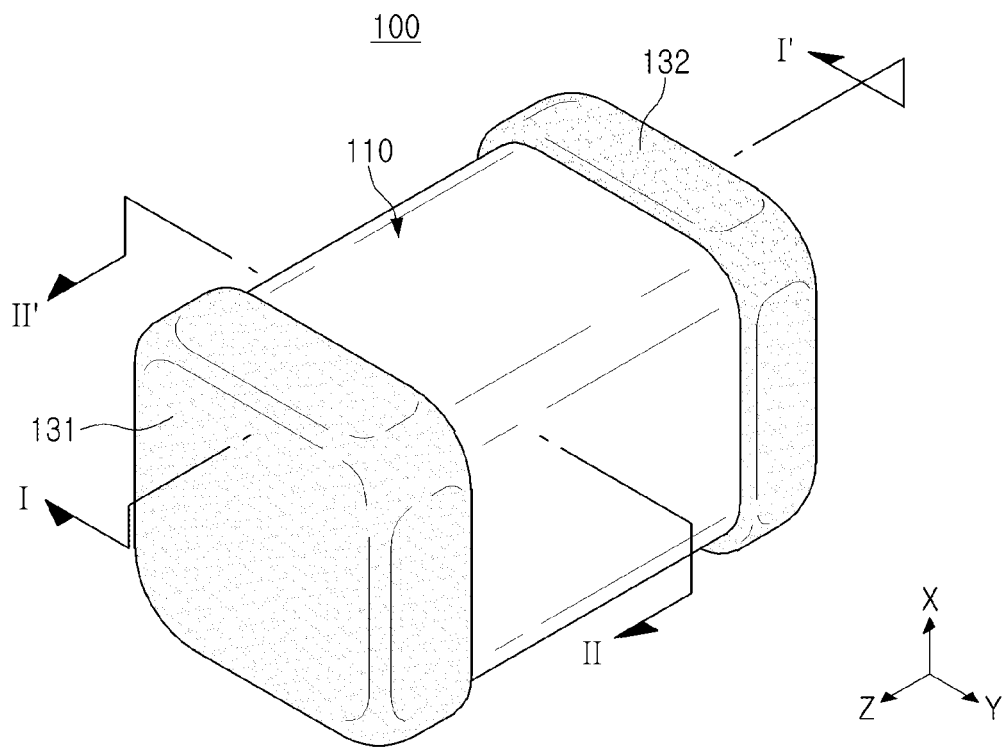
FIG. 1 is a perspective view schematically illustrating an exterior of a multilayer capacitor according to an exemplary embodiment in the present disclosure.
Figure 2:
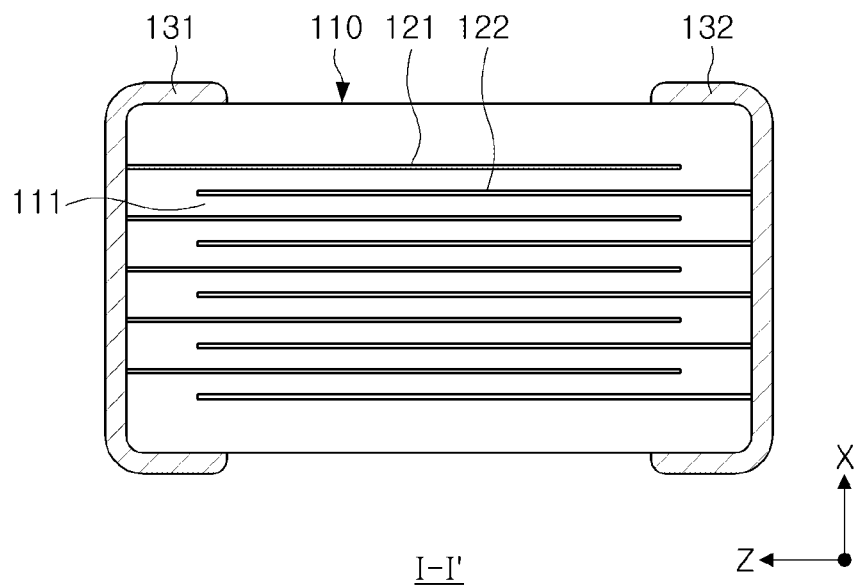
FIG. 2 is a cross-sectional view taken along line I-I' in the multilayer capacitor of FIG. 1.
Figure 3:
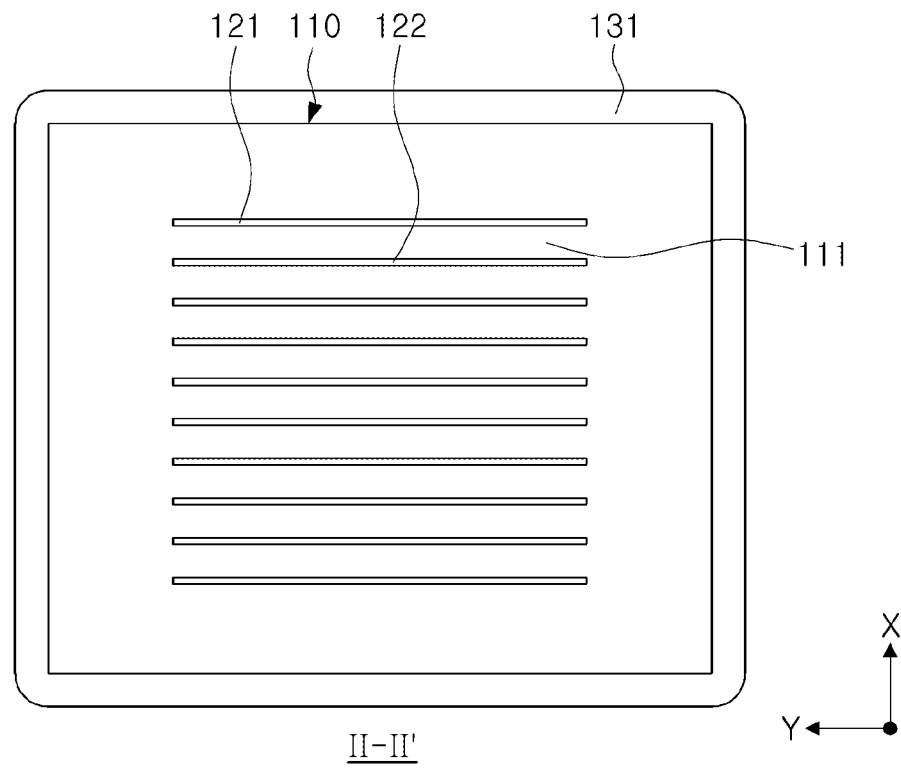
FIG. 3 is a cross-sectional view taken along line II-II' in the multilayer capacitor of FIG. 1.
Figure 4:
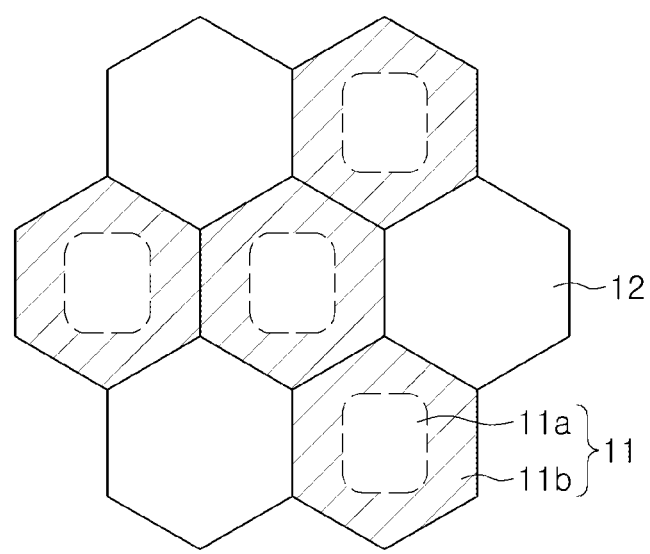
FIG. 4 is a schematic enlarged view of grains of a dielectric layer.

FIG. 1 is a perspective view schematically illustrating an appearance of a multilayer capacitor according to an exemplary embodiment in the present disclosure. FIG. 2 is a cross-sectional view taken along line I-I' in the multilayer capacitor of FIG. 1. FIG. 3 is a cross-sectional view taken along line II-II' in the multilayer capacitor of FIG. 1. FIG. 4 is a schematic enlarged view of grains of a dielectric layer.

Referring to FIGS. 1 through 3, a multilayer capacitor 100 according to an exemplary embodiment in the present disclosure may include a body 110 including dielectric layers 111 and a plurality of internal electrodes 121 and 122 stacked in a first direction (X direction) with each of the dielectric layers 111 interposed therebetween, and external electrodes 131 and 132. Further, the plurality of dielectric layers 111 may include a dielectric expressed by empirical formula $BaM1_aTi_{1-x}Sn_xM2_bO_3$ (0.008≤x≤0.05, 0.006≤a≤0.003, and 0.0006≤b<0.006) in which M1 includes a rare earth element, and M2 includes at least one of Mn or V.

The body 110 may include a stacking structure in which the plurality of dielectric layers 111 are stacked in the first direction (X direction), and may be obtained by, for example, stacking and then sintering a plurality of green sheets. The plurality of dielectric layers 111 may have an integrated form by sintering as described above. As illustrated in FIG. 1, the body 110 may have a shape similar to a rectangular parallelepiped. In the present exemplary embodiment, the dielectric layer 111 included in the body 110 may include a barium-titanate-based ceramic dielectric, which may include Sn, a rare earth element, and a transition metal component. The inventors of the present disclosure have found that a grain size and dielectric constant of the dielectric may be effectively controlled by adjusting the component and content of an additive. In this case, when such an additive is used while being coated on base material powder, growth of dielectric grains may be effectively controlled, and a withstand voltage characteristic of the dielectric and the like may be improved.

As described above, the dielectrics layer 111 may include the dielectric expressed by the empirical formula $BaM1_aTi_{1-x}Sn_xM2_bP_3$ (0.008≤x≤0.05, 0.006≤a≤0.003, and 0.0006≤b<0.006) in which M1 includes a rare earth element, and M2 includes at least one of Mn or V. The Sn component may be coated on the base material powder for doping, and may suppress the growth of the dielectric grains in sintering. Therefore, even in a case in which the dielectric is implemented by using fine powder, an excessive increase in grain size may be suppressed, and a high dielectric constant may be ensured. Specifically, fine dielectric powder needs to be used to decrease the thickness of the dielectric layer 111, and in a case of fine barium titanate powder, a driving force of sintering is increased, and thus, a grain growth control during sintering is difficult, and an excessive grain growth occurs until a sintered body is densified. As a result, deterioration in withstand voltage and high-temperature reliability may occur, and effective capacitance in a DC field may be decreased. In the present exemplary embodiment, the Sn component is added at a content in an optimized range to solve the above-described problems, and in a case in which the Sn component is used while being coated on the base material powder, such an effect may be more fully exhibited.

Further, the Sn component may serve as an acceptor, such that a resistance of the dielectric material to reduction may be improved. In addition, in a case in which Ti is substituted with Sn by doping using Sn, a change to a crystal structure having a high dielectric constant may be made, such that the dielectric constant of the dielectric may be improved. As such, by adding the Sn component, a high dielectric constant may be ensured and the withstand voltage characteristic may be improved even in a case in which the thickness of the dielectric layer 111 is small. The amount of added Sn may be 0.008 to 0.05 mole with respect to 1 mole of Ba, and in a case in which the amount of added Sn is less than 0.008 mole, the above-described effect was not significantly exhibited. On the other hand, in a case in which the amount of added Sn is more than 0.05 mole, impact resistance or the like may deteriorate due to a network formed between Sn. The Sn component may be uniformly dispersed in the grains at the time of sintering, and may be present even in an interface between the dielectric layer 111 and the internal electrode 121, and an interface between the dielectric 111 and the internal electrode 122. Further, in a case in which the growth of the dielectric grains is limited, a core-shell structure may remain in the dielectric grains as illustrated in FIG. 4. Referring to FIG. 4, the dielectric grains may include both a core-shell grain 11 and a grain 12 without the core-shell structure, and the core-shell grain 11 includes a core 11a and a shell portion 11b. Here, the content of Sn in the shell portion 11b may be higher than that in the core 11a.

In a case in which Sn is added, a ratio of Ba to Ti (Ba/Ti) may be increased as compared with general barium titanate, such that the growth of the dielectric grains may be suppressed. In this case, the ratio of Ba to Ti (Ba/Ti) may be in a range of 1.010 to 1.050. In a case in which the ratio of Ba to Ti (Ba/Ti) is 1.050 or more, which corresponds to a high mole ratio, the growth of the dielectric grains during sintering may be suppressed, and densification may be achieved. As a result, an electric characteristic (withstand voltage characteristic) and moisture resistance may be improved.

In the dielectric, M1 is a rare earth element, and the rare earth element may include Dy. M1 is included in a content of 0.006 to 0.03 mole with respect to 1 mole of Ba. When the dielectric includes Dy, the dielectric may include 0.006 to 0.012 mole of Dy with respect to 1 mole of Ba. When the dielectric further includes other rare earth elements (e.g., Tb, Eu, Ce, Sc, Y, and the like) in addition to Dy, the total amount of the rare earth element may be 0.006 to 0.03 mole with respect to 1 mole of Ba, as described above. Further, in the dielectric, M2 includes at least one of Mn or V and is included in a content of 0.0006 to 0.006 with respect to 1 mole of Ba, Mn and V being transition metals. In this case, M2 may include both Mn and V, and the dielectric may include Mn in a content of 0.0003 mole or more less than 0.0035 mole with respect to 1 mole of Ba, and include V in a content of 0.0003 mole or more less than 0.0025 mole with respect to 1 mole of Ba. Similarly to the Sn component, M1 and M2 may be provided while being coated on the base material powder. However, M1 and M2 may be uniformly dispersed in the grains at the time of sintering. In this case, the rare earth element and the transition metal component may function to enhance a schottky barrier, and increase the resistance of the dielectric material to reduction, thereby improving the reliability of the dielectric.

In the present exemplary embodiment, the contents of M1 and M2 may satisfy a specific condition with respect to the content of Sn. That is, the above empirical formula may satisfy a condition $0.12 \leq a/x \leq 3.75$. At the same time or separately, the above empirical formula may satisfy a condition $0.012 \leq b/x \leq 0.75$. Such conditions express appropriate ranges of the relative contents of Sn, M1, and M2 which are the additives and used for doping, the ranges being set in consideration of the above-described functions.

In addition to the above-described components, the dielectric may further include one or more subcomponents. Specifically, the dielectric may further include an Al component in a content of 0.003 mole or more less than 0.012 mole with respect to 1 mole of Ba. Further, the dielectric may further include a Mg component in a content of 0.001 mole or more less than 0.012 mole with respect to 1 mole of Ba. Further, the dielectric may further include a Si component in a content of 0.03 or more with respect to 1 mole of Ba. Such additional subcomponents may be added to the base material powder or may be added while being coated on the base material powder.

Meanwhile, the component of the dielectric applied to the multilayer capacitor may be analyzed by the following methods. In a destructive method, the multilayer capacitor is crushed, the internal electrodes are removed, the dielectric is sorted out, and the component of the sorted dielectric may be analyzed by using a device such as an inductively coupled plasma-optical emission spectroscopy (ICP-OES) instrument or an inductively coupled plasma-mass spectrometry (ICP-MS) instrument. In a non-destructive method, the component in the dielectric grains may be analyzed at a central portion of a chip by using a transmission electron microscopy-energy dispersive spectroscopy (TEM-EDS). Here, the Si component may be measured at a grain boundary, rather than the inside of the grain.

In addition, as described above, effects of improving withstand voltage characteristics, or the like obtainable by using the dielectric may be remarkable when the dielectric layer 111 and the internal electrodes 121 and 122 are thinner than conventional elements. A thickness of the dielectric layer 111 may be 500 nm or less, and a thickness of the internal electrodes 121 and 122 may be 400 nm or less. Here, the thickness of the dielectric layer 111 may refer to an average thickness of the dielectric layer 111 disposed between the internal electrodes 121 and 122. As an example of the measurement standard, an average thickness of the dielectric layer 111 may be measured by scanning images of cross-sections in the first direction (the X direction) and the third direction (the Z direction) of the body 110 with a scanning electron microscope (SEM). For example, for an arbitrary dielectric layer extracted from images scanned with a scanning electron microscope (SEM) of cross-sections in the first and third directions cut from the central portion of the body 110 in the second direction (the Y direction), an average value may be measured by measuring thicknesses thereof at 30 equally spaced points in the third direction. The thicknesses measured at the 30 equally spaced points may be measured in a capacitance forming portion, a region in which the internal electrodes 121 and 122 overlap each other.

Similarly, the thickness of the internal electrodes 121 and 122 may refer to an average thickness. In this case, an average thickness of the internal electrodes 121 and 122 may be measured by scanning images of cross-sections in the first direction (the X direction) and the third direction (the Z direction) of the body 110 with a scanning electron microscope (SEM). For example, for an arbitrary internal electrodes 121 and 122 extracted from images scanned with a scanning electron microscope (SEM) of cross-sections in the first and third directions cut from the central portion of the body 110 in the second direction (the Y direction), an average value may be measured by measuring thicknesses thereof at 30 equally spaced points in the third direction. The 30 equally spaced points may be measured in a capacitance forming portion, which means a region in which the internal electrodes 121 and 122 overlap each other.

The plurality of internal electrodes 121 and 122 may each be obtained by, for example, printing, on one surface of a ceramic green sheet, a paste containing a conductive metal at a predetermined thickness, and then sintering the paste. In this case, the plurality of internal electrodes 121 and 122 may include first and second internal electrodes 121 and 122 exposed in a third direction (Z direction) in which surfaces of the body 110 face each other as illustrated in FIG. 2. Here, the third direction (Z direction) may be perpendicular to the first direction (X direction) and a second direction (Y direction), the second direction being a direction in which a first surface and a second surface of an active part of the body 110 face each other. The first and second internal electrodes 121 and 122 may be connected to the different external electrodes 131 and 132, respectively, have different polarities from each other at the time of driving, and be electrically insulated from each other by each of the dielectric layers 111 disposed therebetween. However, the number of external electrodes 131 and 132, and a manner of connection with the internal electrodes 121 and 122 may vary depending on embodiments. Examples of a main constituent material of the internal electrodes 121 and 122 may include nickel (Ni), copper (Cu), palladium (Pd), and silver (Ag), and alloys thereof.

The external electrodes 131 and 132 may be formed on external surfaces of the body 110, and may include first and second external electrodes 131 and 132 electrically connected to the first and second internal electrodes 121 and 122, respectively. The external electrodes 131 and 132 may be formed by preparing a paste using a material containing a conductive metal and applying the paste on the body 110. Examples of the conductive metal may include nickel (Ni), copper (Cu), palladium (Pd), gold (Au), and alloys thereof. Here, each of the external electrodes 131 and 132 may further include a plating layer containing Ni, Sn, or the like.

The inventors of the present disclosure prepared dielectrics with the following compositions and conducted a reliability test. Unlike the above description, in the following compositions, the content of each element is based on 100 mole of Ba, rather than 1 mole of Ba. A result of a highly accelerated life test (HALT) for each sample is as follows.

TABLE 1

| Sample No. | Sn | Dy | Mn | V | Al | Mg | HALT |
|---|---|---|---|---|---|---|---|
| #1 | 0 | 0.800 | 0.100 | 0.104 | 0.880 | 1.000 | X |
| #2 | 0 | 0.600 | 0.050 | 0.052 | 0.640 | 0.500 | X |
| #3 | 1.000 | 0.600 | 0.03 | 0.03 | 0.880 | 1.000 | ◯ |
| #4 | 1.000 | 0.600 | 0.075 | 0.078 | 0.760 | 0.750 | ◯ |
| #5 | 1.000 | 0.600 | 0.050 | 0.052 | 0.640 | 0.500 | ◯ |
| #6 | 1.000 | 0.800 | 0.050 | 0.052 | 0.640 | 0.500 | ◯ |
| #7 | 1.000 | 0.840 | 0.075 | 0.075 | 0.360 | 0.100 | ◯ |
| #8 | 1.000 | 1.200 | 0.150 | 0.150 | 0.720 | 0.200 | ◯ |
| #9 | 1.000 | 0.900 | 0.35 | 0.25 | 0.620 | 0.150 | X |
| #10 | 1.000 | 1.080 | 0.098 | 0.098 | 1.2 | 1.2 | X |

According to the above test results, samples (#3 to #8) satisfying the above empirical formula of the present exemplary embodiment exhibited favorable results in the HALT. Such samples not only satisfied an intended capacitance condition, but also had excellent withstand voltage characteristic and reliability. In the samples, Dy was used as a rare earth element, and when Dy was 0.6 to 1.2 mol with respect to 100 mol of Ba, excellent reliability was obtained. However, as described above, the dielectric may further include other rare earth elements (e.g., Tb, Eu, Ce, Sc, Y, and the like) in addition to Dy. In this case, the total amount of rare earth elements may be 0.6 to 3.0 mole with respect to 100 mol of Ba, as a preferable condition. Unlike samples according to an embodiment, in the remaining samples according to the comparative example, at least one of an Sn content condition, a rare earth element content condition, a transition metal content condition, or the like of the present disclosure were not satisfied, and showed a relatively poor withstand voltage characteristic in the HALT.

As set forth above, according to the exemplary embodiment in the present disclosure, the multilayer capacitor may have a high capacitance and excellent reliability such as a withstand voltage characteristic.

While exemplary embodiments have been shown and described above, it will be apparent to those skilled in the art that modifications and variations could be made without departing from the scope of the present disclosure as defined by the appended claims.

What is claimed is:

1. A multilayer capacitor comprising:
    a body including a plurality of dielectric layers, and a plurality of internal electrodes stacked with one of the dielectric layers interposed therebetween; and
    external electrodes disposed on external surfaces of the body and connected to the internal electrodes, respectively,
    wherein the plurality of dielectric layers include a dielectric expressed by empirical formula $BaM1_aTi_{1-x}Sn_xM2_bO_3$ ($0.008 \leq x \leq 0.05$, $0.006 \leq a \leq 0.03$, and $0.0006 \leq b < 0.006$) in which M1 includes a rare earth element, and M2 includes at least one of Mn or V.

2. The multilayer capacitor of claim 1, wherein the rare earth element includes Dy.

3. The multilayer capacitor of claim 2, wherein the dielectric includes Dy in a content of 0.006 to 0.012 mole with respect to 1 mole of Ba.

4. The multilayer capacitor of claim 1, wherein M2 includes both Mn and V, and the dielectric includes Mn in a content of 0.0003 mole or more less than 0.0035 mole with respect to 1 mole of Ba, and includes V in a content of 0.0003 mole or more less than 0.0025 mole with respect to 1 mole of Ba.

5. The multilayer capacitor of claim 1, wherein the dielectric further includes an Al component in a content of 0.003 mole or more less than 0.012 mole with respect to 1 mole of Ba.

6. The multilayer capacitor of claim 1, wherein the dielectric further includes a Mg component in a content of 0.001 mole or more less than 0.012 mole with respect to 1 mole of Ba.

7. The multilayer capacitor of claim 1, wherein the dielectric further includes a Si component in a content of 0.03 mole or more with respect to 1 mole of Ba.

8. The multilayer capacitor of claim 1, wherein the empirical formula satisfies a condition $0.12 \leq a/x \leq 3.75$.

9. The multilayer capacitor of claim 1, wherein the empirical formula satisfies a condition $0.012 \leq b/x \leq 0.75$.

10. The multilayer capacitor of claim 1, wherein in the empirical formula, a ratio of Ba to Ti (Ba/Ti) is 1.010 to 1.050.

11. The multilayer capacitor of claim 1, wherein at least one of grains included in the plurality of dielectric layers has a core-shell structure including a core and a shell portion covering the core.

12. The multilayer capacitor of claim 11, wherein a content of Sn in the shell portion is higher than that in the core.

13. The multilayer capacitor of claim 1, wherein an average thickness of one of the plurality of dielectric layers is 500 nm or less.

14. The multilayer capacitor of claim 1, wherein an average thickness of one of the plurality of internal electrodes is 400 nm or less.

15. A dielectric expressed by empirical formula $BaM1_aTi_{1-x}Sn_xM2_bO_3$ ($0.008 \leq x \leq 0.05$, $0.006 \leq a \leq 0.03$, and $0.0006 \leq b < 0.006$), in which M1 includes a rare earth element, and M2 includes at least one of Mn or V.

16. The dielectric of claim 15, wherein the rare earth element includes Dy, and Dy is in a content of 0.006 to 0.012 mole with respect to 1 mole of Ba.

17. The dielectric of claim 15, wherein M2 includes both Mn and V, Mn is in a content of 0.0003 mole or more less than 0.0035 mole with respect to 1 mole of Ba, and V is in a content of 0.0003 mole or more less than 0.0025 mole with respect to 1 mole of Ba.

18. The dielectric of claim 15, further comprising an Al component in a content of 0.003 mole or more less than 0.012 mole with respect to 1 mole of Ba.

19. The dielectric of claim 15, wherein the empirical formula satisfies a condition $0.12 \leq a/x \leq 3.75$.

20. The dielectric of claim 15, wherein the empirical formula satisfies a condition $0.012 \leq b/x \leq 0.75$.

* * * * *